United States Patent
Murotani (10) Patent No.: US 6,741,542 B2
(45) Date of Patent: May 25, 2004

(54) DISK DEVICE

(75) Inventor: Kiichiro Murotani, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 238 days.

(21) Appl. No.: 09/752,718

(22) Filed: Jan. 3, 2001

(65) Prior Publication Data

US 2001/0002187 A1 May 31, 2001

Related U.S. Application Data (63) Continuation of application No. PCT/JP99/02527, filed on May 14, 1999.

(51) Int. Cl.$^7$ .................. G11B 19/00; G11B 21/02
(52) U.S. Cl. ............................... 369/220
(58) Field of Search .................. 369/220, 219, 369/75.1, 75.2, 77.1, 77.2, 223, 244, 249, 215

(56) References Cited

U.S. PATENT DOCUMENTS

| | | | | |
|---|---|---|---|---|
| 4,453,245 A | * | 6/1984 | Sugiyama et al. | 369/220 |
| 4,563,712 A | * | 1/1986 | Nishio et al. | 360/75 |
| 4,797,869 A | * | 1/1989 | Hirano | 369/75.2 |
| 4,947,481 A | * | 8/1990 | Ikedo et al. | 369/215 |
| 4,977,554 A | * | 12/1990 | Hangai et al. | 369/215 |
| 5,533,000 A | * | 7/1996 | Koizumi | 369/270 |
| 5,553,054 A | * | 9/1996 | Gardner et al. | 369/117 |
| 6,009,062 A | * | 12/1999 | Nashimoto et al. | 369/77.2 |

FOREIGN PATENT DOCUMENTS

| | | | | |
|---|---|---|---|---|
| JP | 05012684 A | * | 1/1993 | G11B/7/085 |
| JP | 7-6489 | | 1/1995 | |
| JP | 7-129969 | | 5/1995 | |
| JP | 7-320379 | | 12/1995 | |
| JP | 7-326119 | | 12/1995 | |
| JP | 08111076 A | * | 4/1996 | G11B/21/02 |
| JP | 08138334 A | * | 5/1996 | G11B/21/08 |
| JP | 8-147717 | | 6/1996 | |
| JP | 8-147905 | | 6/1996 | |
| JP | 9-213032 | | 8/1997 | |
| JP | 9-231654 | | 9/1997 | |
| JP | 09282774 A | * | 10/1997 | G11B/19/00 |
| JP | 10-228702 | | 8/1998 | |

\* cited by examiner

Primary Examiner—George J. Letscher
Assistant Examiner—G R Magee
(74) Attorney, Agent, or Firm—Birch, Stewart, Kolasch & Birch, LLP (57) ABSTRACT

A disk device of the present invention includes a switch 132 for mechanically detecting a displacement of an optical pickup 114, provided on a movable body 115, to a disk inner peripheral position and for switching its internal state. The switch 132 also detects the inner peripheral positions of a minidisk and a compact disk. The disk device also includes a movable member 131, which switches the internal state of the switch 132 when the movable body 115 is displaced to the disk inner peripheral position. The displacement of the optical pickup 114 to the inner peripheral position on a minidisk or a compact disk is detected based on the internal state of the switch 132 and the flow direction of current supplied to the motor 116 for driving the movable body 115.

6 Claims, 9 Drawing Sheets

DISK DEVICE

CROSS-REFERENCE TO THE RELATED APPLICATION

This Application is a continuation of International Application No. PCT/JP99/02527, whose International filing date is May 14, 1999, the disclosures of which Application are incorporated by reference herein.

BACKGROUND OF THE INVENTION

1. Field of the Invention

The present invention relates to a disk device capable of loading different type of information recording media, such as a CD (compact disk) used as a single disk and an MD (minidisk) used in cartridge stored form, on a turntable at different times and thereafter ejecting such media from the turntable.

2. Description of the Related Art

Figure 1:
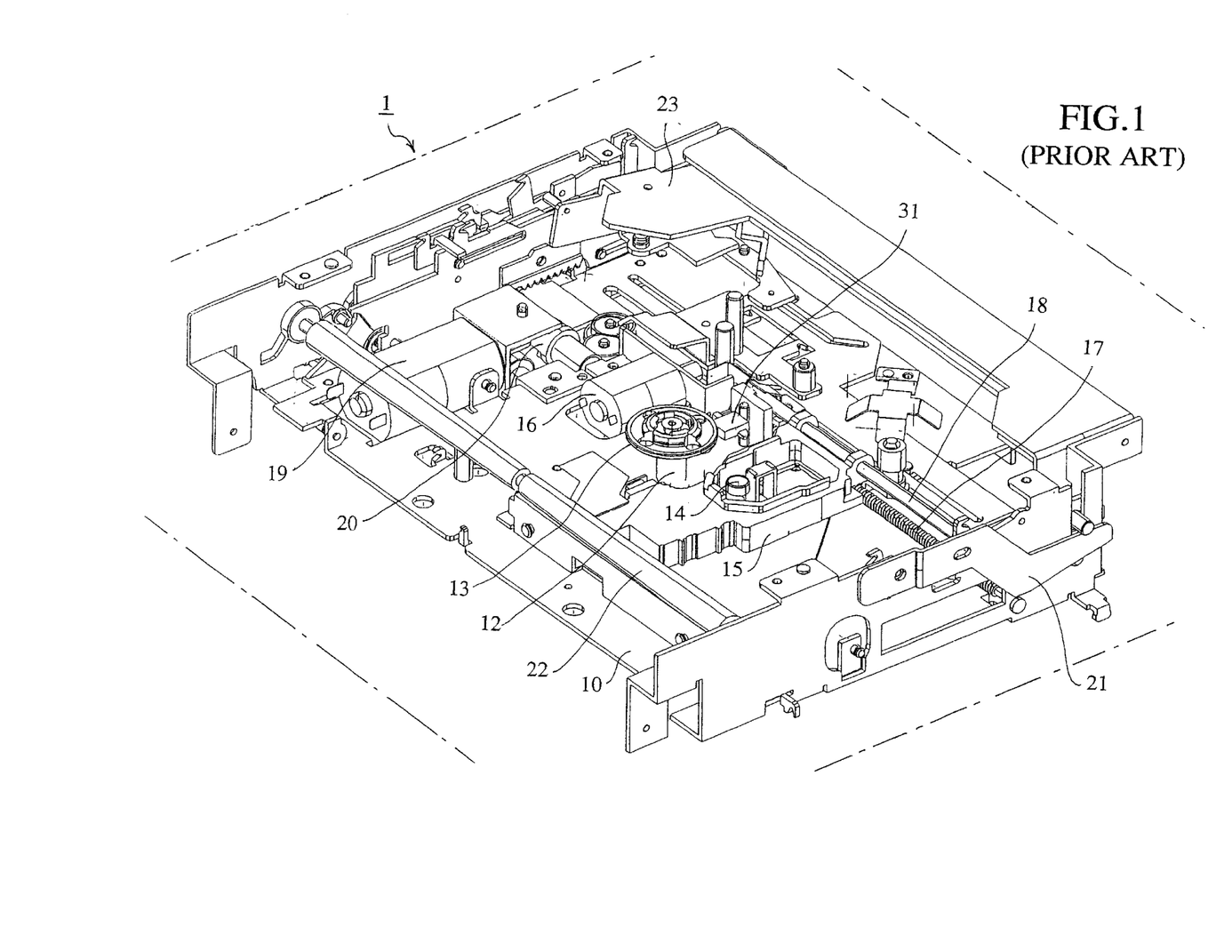
FIG. 1 is a schematic figure of a conventional disk device.

FIG. 1 is a schematic view of a conventional disk device. In the figure, reference numeral 1 denotes a disk device used in common with an MD and a CD, 10 is a chassis, 12 is a spindle motor, 13 is a turntable, 14 is an optical pickup, and 15 is a movable body provided with the optical pickup 14. 16 is a motor for displacing the movable body 15, 17 is a feed screw. The feed screw 17 is rotated by the motor 16 and engages with the engaging member (not shown) which is provided on the movable body 15. The movable body 15 displaces in a linear manner along the feed screw 17 by the rotation of the feed screw 17. 18 is a guide shaft which guides the linear displacement of the movable body 15 along the feed screw 17.

19 is a motor which acts as a drive source for the refuge operation of a CD clamp and a CD adapter (not shown), for the loading operation of a CD onto the turntable by the CD clamp and the CD adapter, and for the retracting operation of an MD holder (not shown) into the device.

20 is a clutch which switches the transmission route of the rotational force of the motor 19. The clutch 20 enables the motor 19 to be used as a drive source for the CD clamp and CD adapter refuge operation and for the retracting operation of the MD holder into the device. Furthermore, the clutch 20 enables the motor 19 to be used as a drive source for the loading operation of the CD onto the turntable due to the CD adapter and the CD clamp. Thus, a single motor 19 can be used in common as a drive source for respective operations. Furthermore, the switching of the clutch 20 is performed by an electrical or mechanical clutch switching means which is provided separately to switch the clutch.

21 is an arm for lowering an MD (not shown), which is housed in the MD holder and drawn into the device, onto the turntable 13 after completion of the refuge operation of the CD adapter and the CD clamp.

22 is a feed roller for carrying a CD inserted from the CD and MD insertion mouth (not shown) into the device. 23 is an arm support member which pivotably supports the base of the CD adapter arm on the tip of which the CD adapter is arranged and the base of the CD clamp arm on the tip of which the CD clamp is arranged. 31 is a switch for detecting an inner peripheral position of an MD.

Next, the operation of the conventional disk device will be explained.

When an MD is inserted from the CD and MD insertion mouth (not shown), the inserted MD is drawn into the device and set on the turntable 13. At this time, the CD adapter and the CD clamp do not impede the MD in a set position. For example, these components are refuged in a predetermined position into the device.

On the other hand, when a CD is inserted from the CD and MD insertion mouth, the inserted CD is conveyed into the device by the feed roller 22, its rotational center is gripped by the CD adapter and the CD clamp and it is placed on the turntable 13 in that state.

When the inserted recording medium disk is a CD, the inserted CD is rotated by the turntable 13 and information is read out by an optical pickup 14, which displaces in an outer peripheral direction of the CD by the displacement of the movable body 15.

On the other hand, when the inserted recording medium disk is an MD, an aperture formed in the case of the inserted MD is opened, the recording medium disk in the case is rotated by the turntable 13 and information is read out through the aperture by the optical pickup 14, which is displaced in an outer peripheral direction of the MD by the displacement of the movable body 15.

The disk inner peripheral position in which the movable body 15, provided with an optical pickup 14, is displaced in case of playing a CD is different from that in case of an MD. Thus, it is necessary to separately provide a CD inner peripheral position defining switch which defines a disk inner peripheral position in which the movable body 15 is displaced when playing the CD and an MD inner peripheral position defining switch which defines a disk inner peripheral position in which the movable body 15 is displaced when playing the MD.

Since the conventional disk device is constructed as above, the number of components and the complexity of the design are increased due to the necessity of providing the CD inner peripheral position defining switch and the MD inner peripheral position defining switch in a predetermined position depending on the inner peripheral position of the CD or MD.

SUMMARY OF THE INVENTION

The present invention is proposed to solve the above problem and has the object of providing a disk device with a reduced number of components and with a simplified and more compact structure, which can be used with a non case-stored information recording medium disk such as a CD which is used singly and with a case-stored information recording medium disk such as an MD which is used in a cartridge stored form.

According to the present invention, a disk device is provided with a disk inner peripheral position detection means for detecting the motion of an optical pickup to a disk inner peripheral position of a case-stored recording medium disk or a disk inner peripheral position of a non case-stored recording medium disk. The disk inner peripheral position detection means is also used to detect the disk inner peripheral position of the case-stored recording medium disk and the non case-stored recording medium disk.

By such an arrangement, it is not necessary to separately provide a detection means for the detection of the disk inner peripheral position of the case-stored recording medium disk and the non case-stored recording medium disk. Thus, a disk device for use with both the case-stored recording medium disk and the non case-stored recording medium disk can be realized in a compact size with a simplified structure and with a reduced number of parts.

The disk device according to the present invention may be provided with a detection means for detecting the displacement of the optical pickup to the inner peripheral position of the disk thereby switching its internal state, while detecting the inner peripheral position of the case-stored recording medium disk and the non case-stored recording medium disk. In this case, the device is adapted to detect displacement of the optical pickup to the inner peripheral position of the case-stored recording medium disk or the non case-stored recording medium disk based on the detection result of the detection means and the direction of displacement of the carriage.

By such an arrangement, it is not necessary to separately provide a detection means for the detection of the disk inner peripheral position of the case-stored recording medium disk and a detection means for the detection of the disk inner peripheral position of the non case-stored recording medium disk. Thus, a disk device for use with both the case-stored recording medium disk and the non case-stored recording medium disk can be realized in a compact size with a simplified structure and with a reduced number of parts. Furthermore, the disk inner peripheral position detection means detects the displacement of the optical pickup to the inner peripheral position of the case-stored recording medium disk or the non case-stored recording medium disk based on the direction of displacement of the carriage and the detection result of the detection means which can detect the inner peripheral position of the case-stored recording medium disk and the non case-stored recording medium disk. Thus, it is possible to realize a disk device in a compact size with a simplified structure and a reduced number of parts, which can be used with both the case-stored recording medium disk and the non case-stored recording medium disk.

The disk device according to the present invention may be provided with a switch for mechanically detecting that the optical pickup provided on the carriage is displaced to the inner peripheral position of the disk, thereby switching its internal state, the switch also detecting the inner peripheral position of both the case-stored recording medium disk and the non case-stored recording medium disk, and a switch abutment member for switching the internal state of the switch when the carriage is displaced to the inner peripheral position of the disk. In this case, the device is adapted to detect displacement of the optical pickup to the inner peripheral position of the case-stored or non case-stored recording medium disk based on the internal state of the switch and the flow direction of current supplied to the motor which drives the carriage.

With such an arrangement, since the displacement of the optical pickup to the inner peripheral position of the case-stored or non case-stored recording medium disk is detected based on a switch in the internal state of the switch by the switch abutment member and the flow direction of current supplied to the motor which drives the carriage, it is possible to realize a disk device with a reduced number of parts and with a simplified and compact structure.

According to the present invention, a disk device is provided with a first detection means for detecting displacement of an optical pickup to an inner peripheral position of a case-stored recording medium disk, a second detection means for detecting displacement of the optical pickup to an inner peripheral position of a non case-stored recording medium disk, and a detection selection means for selecting the detection result of the second detection means, which detects the displacement of the optical pickup to the inner peripheral position of the non case-stored recording medium disk, in response to the direction of displacement of the carriage.

By such an arrangement, it is possible to use the detection output of the second detection means for other purposes, since the detection output of the second detection means is not generated due to the direction of displacement of the carriage.

DETAILED DESCRIPTION OF THE PREFERRED EMBODIMENTS

In order to explain the invention in greater detail, the preferred embodiments of the invention will be outlined below with reference to the accompanying figures.

Embodiment 1

Figure 2:
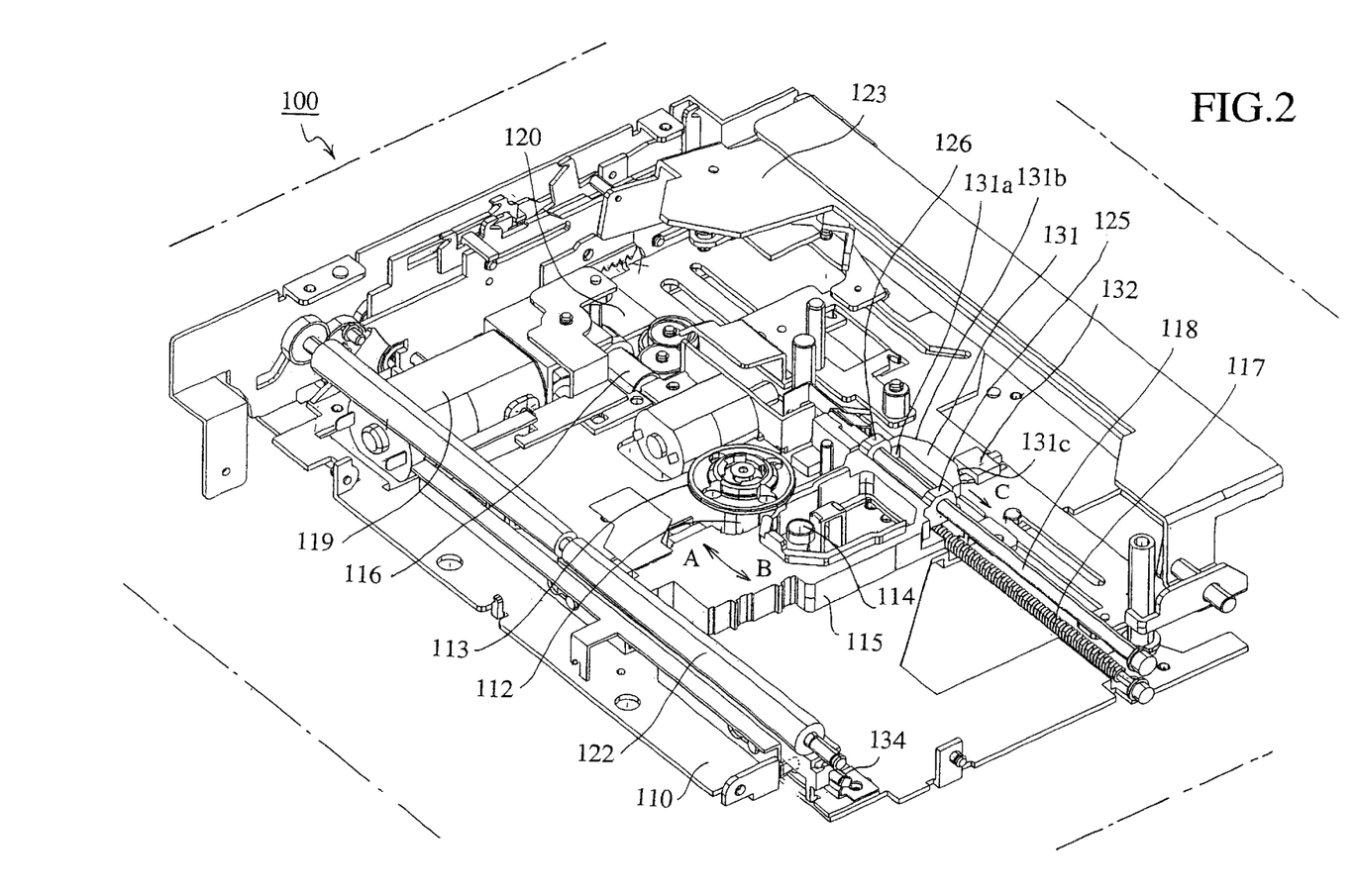
FIG. 2 is a view of the structure of a disk device according to a first embodiment of the present invention.

FIG. 2 shows the structure of a disk device according to a first embodiment of the present invention. In the figure, 100 is a disk device for common use with an MD and CD, 110 is a chassis, 112 is a spindle motor, 113 is a turntable, 114 is an optical pickup, 115 is a movable body (carriage) provided with an optical pickup. The movable body 115 can be displaced in the direction of the arrows A and B within a range corresponding to the playing range of the CD and MD. The movable body 115 is provided with guide shaft engaging sections 125, 126 which are fit to the guide shaft 118 with a predetermined clearance so as to be slidable.

116 is a motor for driving the movable body 115 in the directions A and B. 117 is a feed screw which is rotated by the motor 116. The feed screw 117 engages with an engaging member (not shown) formed on the movable body 115. The movable body 115 is displaced linearly in the direction A and B along the feed screw 117 by the rotation of the feed screw 117. 118 and 134 are guide shafts, which guide the linear displacement of the movable body 115 along the feed screw 117.

119 is a motor, which acts as a source of drive power for a refuge operation of a CD clamp and CD adapter (not shown), for a loading operation of the CD onto the turntable 113 by the CD clamp and CD adapter and for a retracting operation of an MD holder (not shown) into the device.

120 is a clutch, which switches the transmission route of the rotational force of the motor 119. The clutch 120 enables the motor 119 to be used as a drive source for the CD clamp and CD adapter refuge operation and for the retracting operation of the MD holder into the device. Furthermore, the clutch 120 enables the motor 119 to be used as a drive source for the loading operation of the CD onto the turntable due to the CD adapter and the CD clamp. Thus, a single motor 119 can be used commonly as a drive source for respective operations. The clutch 120 has a fixed clutch tooth section on the output shaft and a movable clutch tooth section which is slidable in a direction parallel to a central axis of rotation and is linked with the output rotation shaft of the motor 119. When the movable clutch tooth section displaces in the direction parallel to the central axis of rotation and engages with the fixed clutch tooth section, the rotational force of the motor 119 is transmitted to the output shaft.

When the movable clutch tooth section displaces in the reverse direction to the previous displacement and the engagement with the fixed clutch tooth section is released, the transmission of rotational force of the motor 119 to the output shaft is released.

122 is a feed roller for feeding a CD inserted from the CD and MD insertion mouth into the device. 123 is an arm support member which pivotally supports the base of the CD adapter arm on the tip of which the CD adapter is formed and the base of the CD clamp arm on the tip of which the CD clamp is formed 131 is a movable member (disk inner peripheral position detection means, detection means, switch abutment member) which can move in the direction of displacement of the movable body 115 on the chassis 110. For example, it may be urged in the direction of the arrow C by a spring. An abutting piece 131a which abuts with the side face of the guide shaft engaging portion 126 of the movable body 115 and first and second inclined faces 131b and 131c which act on the actuator of the switch 132 (disk inner peripheral position detection means, detection means) with the displacement of the movable member 131 and which determine the timing of switching the state of the switch 132 are formed on the movable member 131.

132 is a switch for detecting an inner peripheral position of the CD and the MD.

The operation of the disk device according to the first embodiment of the present invention will now be explained.

When an MD is inserted from the CD and MD insertion mouth (not shown), the inserted MD is drawn into the device and set on the turntable 113. At that time, the CD clamp and the CD adapter are in a position which does not interfere with the MD in the set position. For example, the CD clamp and the CD adapter are refuged in a predetermined position into the device.

On the other hand, when a CD is inserted from the CD and MD insertion mouth (not shown), the inserted CD is conveyed into the device by the feed roller 122, its rotational center is gripped by the CD clamp and the CD adapter. The inserted CD is placed on the turntable 113 in that state.

In a case where the inserted recording medium disk is a CD, the inserted CD is rotated by the turntable 113, information is read out by the optical pickup 114 provided on the movable body 115 which displaces in the direction of the arrow B from the inner peripheral position of the CD, and the disk is played.

On the other hand, in a case where the inserted recording medium disk is an MD, an aperture provided in the case of the inserted MD is opened, the recording medium disk in the case is rotated by the turntable 113. As a result, information is read out by the optical pickup 114 provided on the movable body 115 which displaces in the direction of the arrow B from the inner peripheral position on the MD, and the disk is played.

Next, the displacement of the movable body 115 to the respective inner peripheral positions on the CD and MD will be explained.

Figure 3:
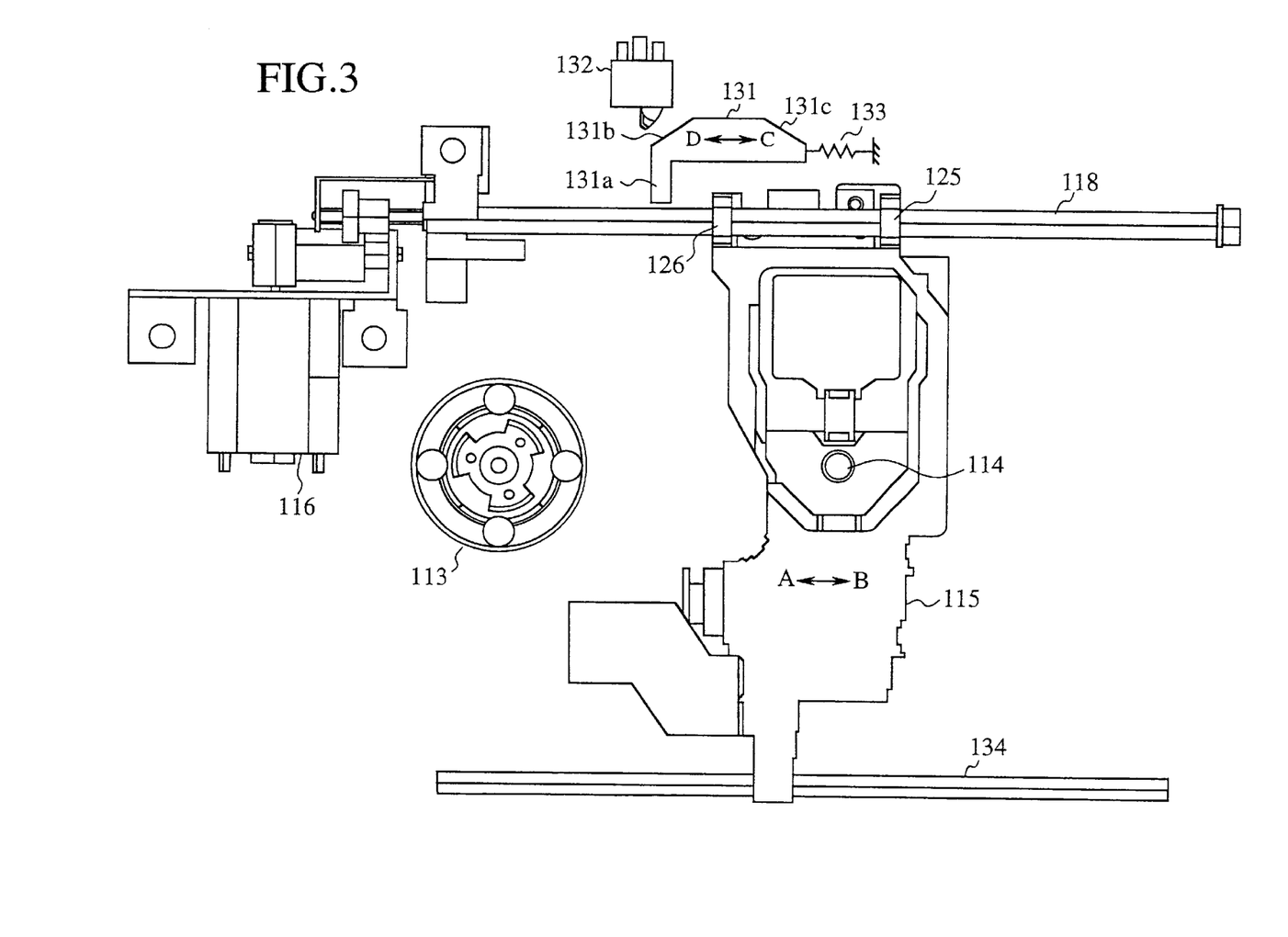
FIG. 3 is an explanatory view of the relationship of the movable body, the moveable member and the switch, which displace in the playing region of the CD in a disk device according to a first embodiment of the present invention.
Figure 4:
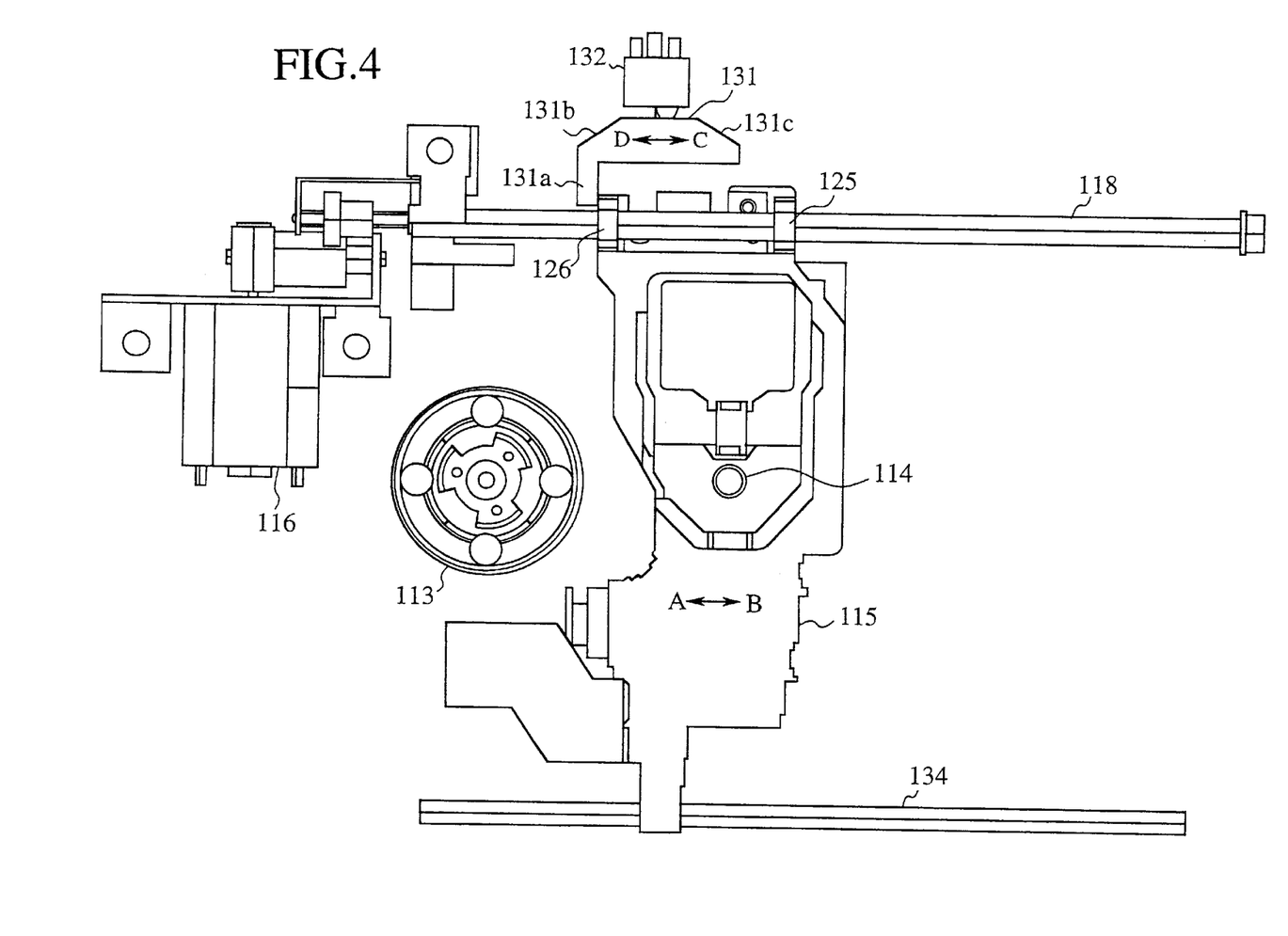
FIG. 4 is an explanatory view of the relationship of the movable body, the moveable member and the switch which displace between the inner peripheral position of the MD and the inner peripheral position of the CD in a disk device according to a first embodiment of the present invention.
Figure 5:
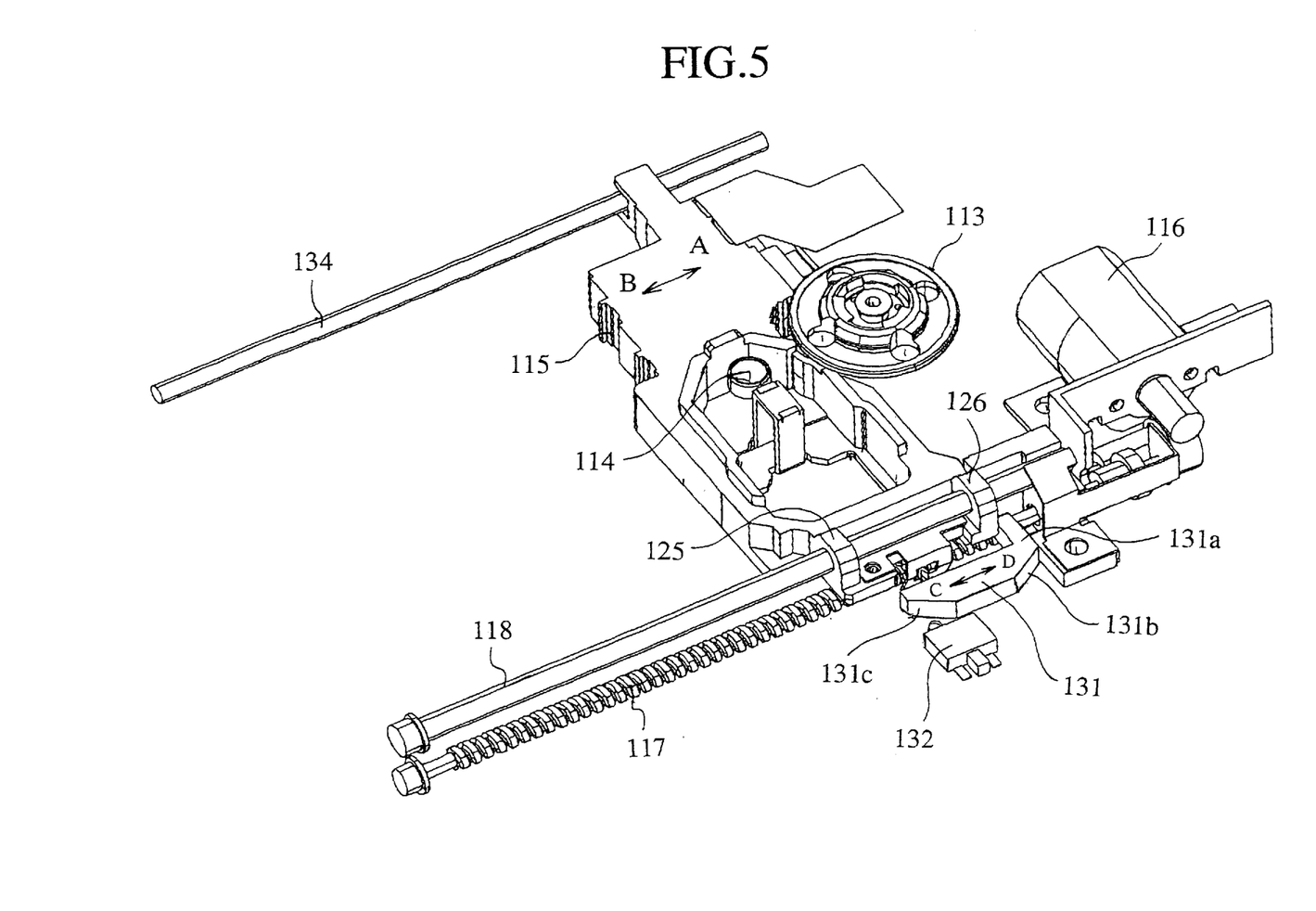
FIG. 5 is a three dimensional explanatory view of the relationship of the movable body, the moveable member and the switch which displace to an inner peripheral position of the MD in a disk device according to a first embodiment of the present invention.
Figure 6:
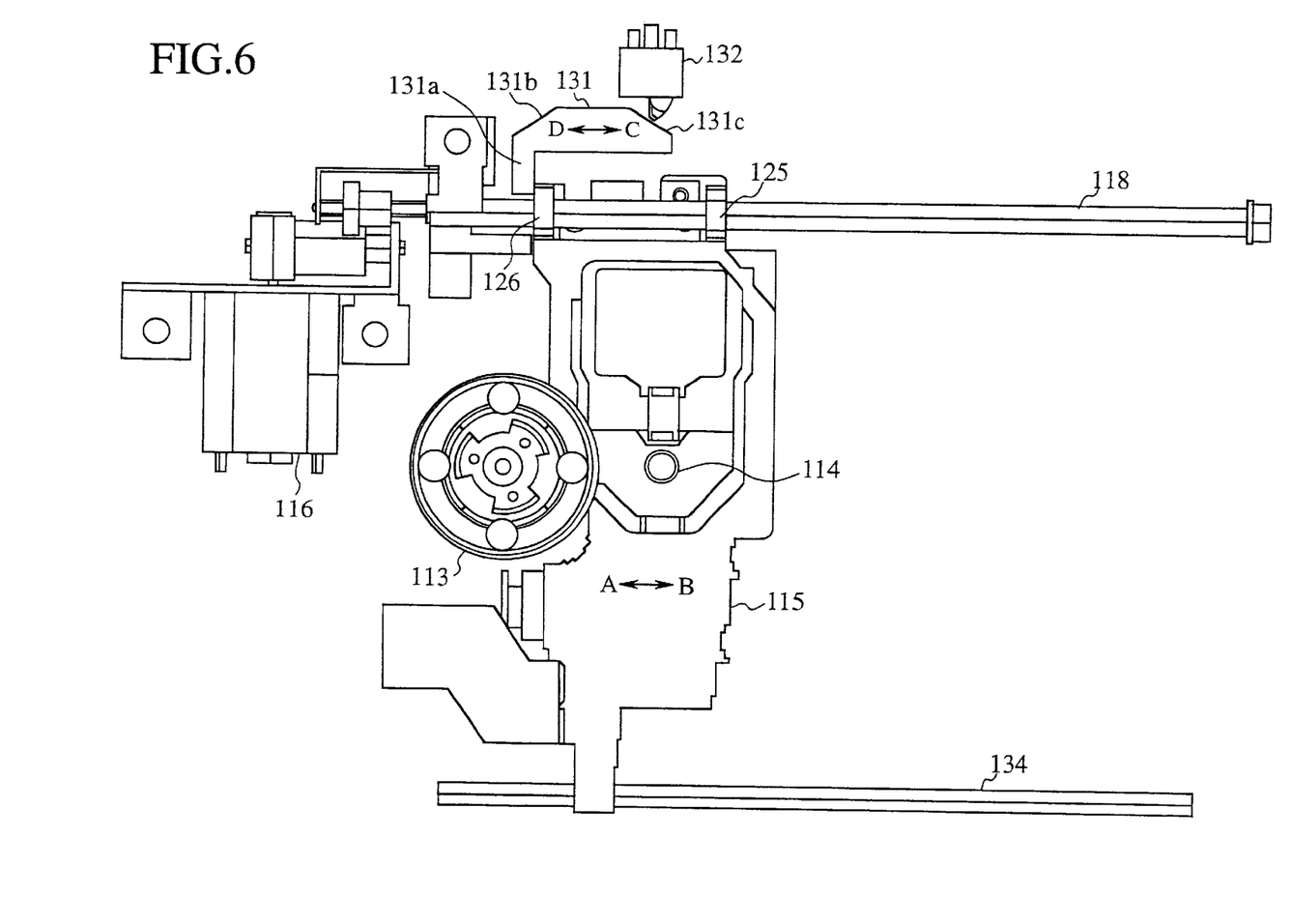
FIG. 6 is a plan view of the device as shown in FIG. 5 in a disk device according to a first embodiment of the present invention.

FIG. 3 shows the relationship of the movable body 115, which displaces to a playing region of the CD, with the movable member 131 and the switch 132. FIG. 4 shows the relationship of the movable body 115, which displaces between an inner peripheral position of the MD and an inner peripheral position of the CD, with the movable member 131 and the switch 132. FIG. 5 is an explanatory three dimensional figure explaining the relationship of the movable body 115, which displaces to the inner peripheral position of the MD, with the movable member 131 and the switch 132. FIG. 6 is a plan figure of that shown in FIG. 5.

When the movable body 115 displaces to the playing region of the CD, the abutting piece 131a of the movable member 131 does not abut with the guide shaft engaging section 126 of the movable body 115 as shown in FIG. 3.

When the movable body 115 displaces further in the direction of the arrow A from the above situation, firstly the side face of the guide shaft engaging section 126 of the movable body 115 abuts with the abutting piece 131a of the movable member 131 and the movable member 131 is displaced in the direction of the arrow D against the urging force of the spring 133. Due to the displacement of the movable member 131 in the direction of the arrow D, the actuator of the switch 132 is depressed by the first inclined face 131b, thus, the internal state of the switch 132 is switched from an initial state in which the actuator is not depressed to an operational state in which the actuator is depressed.

The inner peripheral position of the CD is detected from the timing of switching the internal state of the switch 132 from an initial state to an operational state and from the direction of the current which is supplied to the motor 116.

In a case where the inserted recording medium disk is an MD, the movable body 115 displaces further in the direction of the arrow A. As shown in FIG. 4, the actuator of the switch 132 continues to be depressed by the movable member 131, and the internal state of the switch 132 is maintained in the operational state.

When the movable body 115 displaces further in the direction of the arrow A from the position as shown in FIG. 4, the movable body 115 abuts with the actuator of the switch 132 at the second inclined face 131c. As a result, when the movable body 115 further displaces in the direction of the arrow A, the actuator of the switch 132 slides on the second inclined face, the depression to the actuator of the switch 132 is released at a predetermined position on the second inclined face, and the internal state of the switch 132 returns to the initial state from the operational state.

The inner peripheral position of the MD is detected from the timing in which the internal state of the switch 132 returns to the initial state from the operational state, and from the direction of current supplied to the motor 116.

In this situation, as shown in FIGS. 5 and 6, the actuator of the switch 132 is in a state of not abutting with the second inclined face 131c of the movable member 131. In the example as shown in the figure, the movable member 131 is not provided separately to the movable body 115. However, if space was not a problem, the movable member 131 may be fixed to the movable body 115.

As shown above, according to the first embodiment, it is possible to detect the displacement of the movable body 115 and the optical pickup 114 to the inner peripheral position of the CD or MD based on the state of the single switch 132 and the direction of current supplied to the motor 116 for driving the movable body 115. Thus, in comparison with the conventional disk device, it is possible to reduce the number of switches needed to detect the displacement of the movable body 115 to the inner peripheral position of the CD or MD. As a result, it is possible to provide a disk device with a simplified and more compact structure, which is adapted for use with both CD and MD.

Embodiment 2

Figure 7:
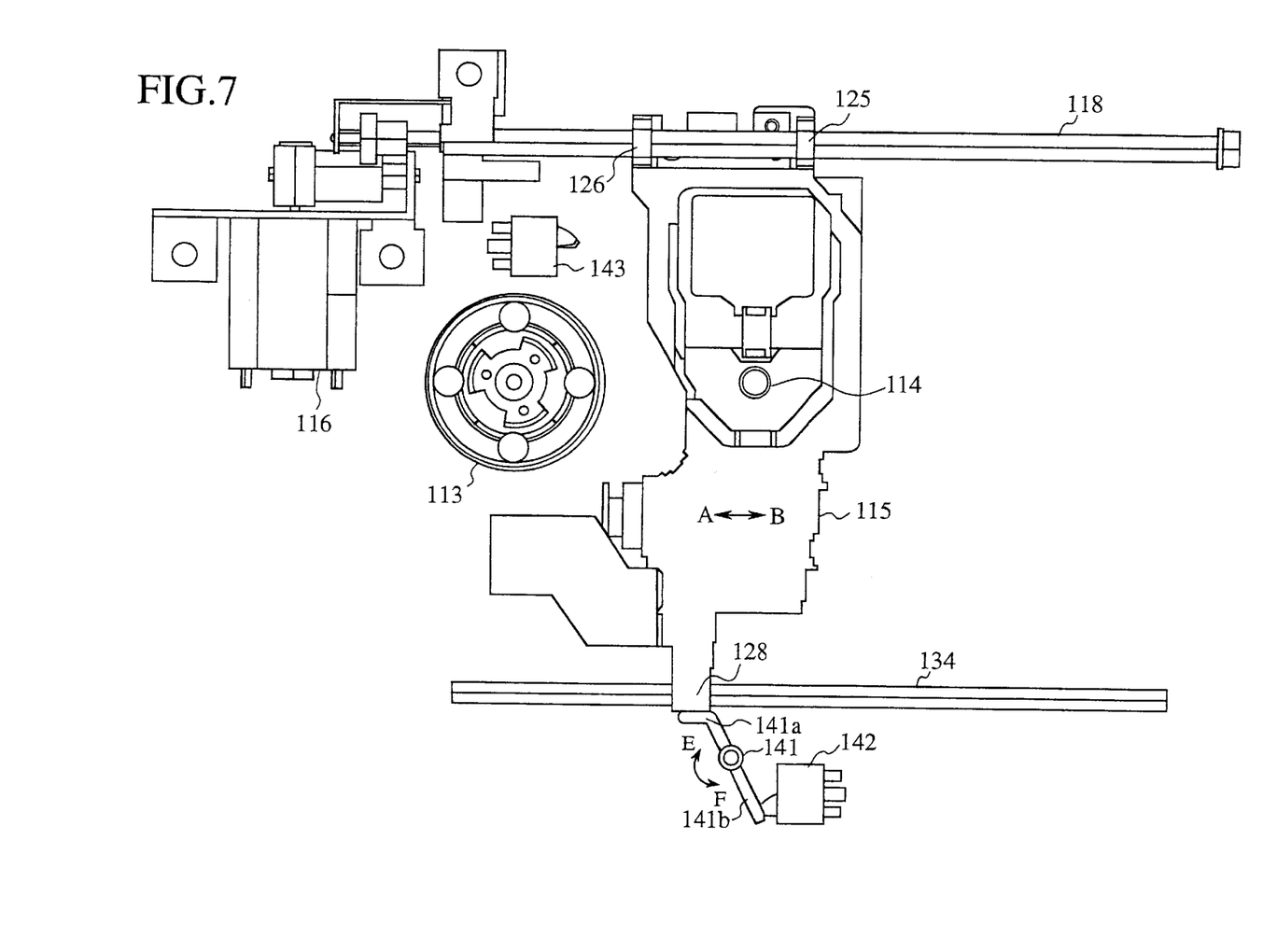
FIG. 7 is an explanatory view of a section of a disk device according to a second embodiment of the present invention.
Figure 8:
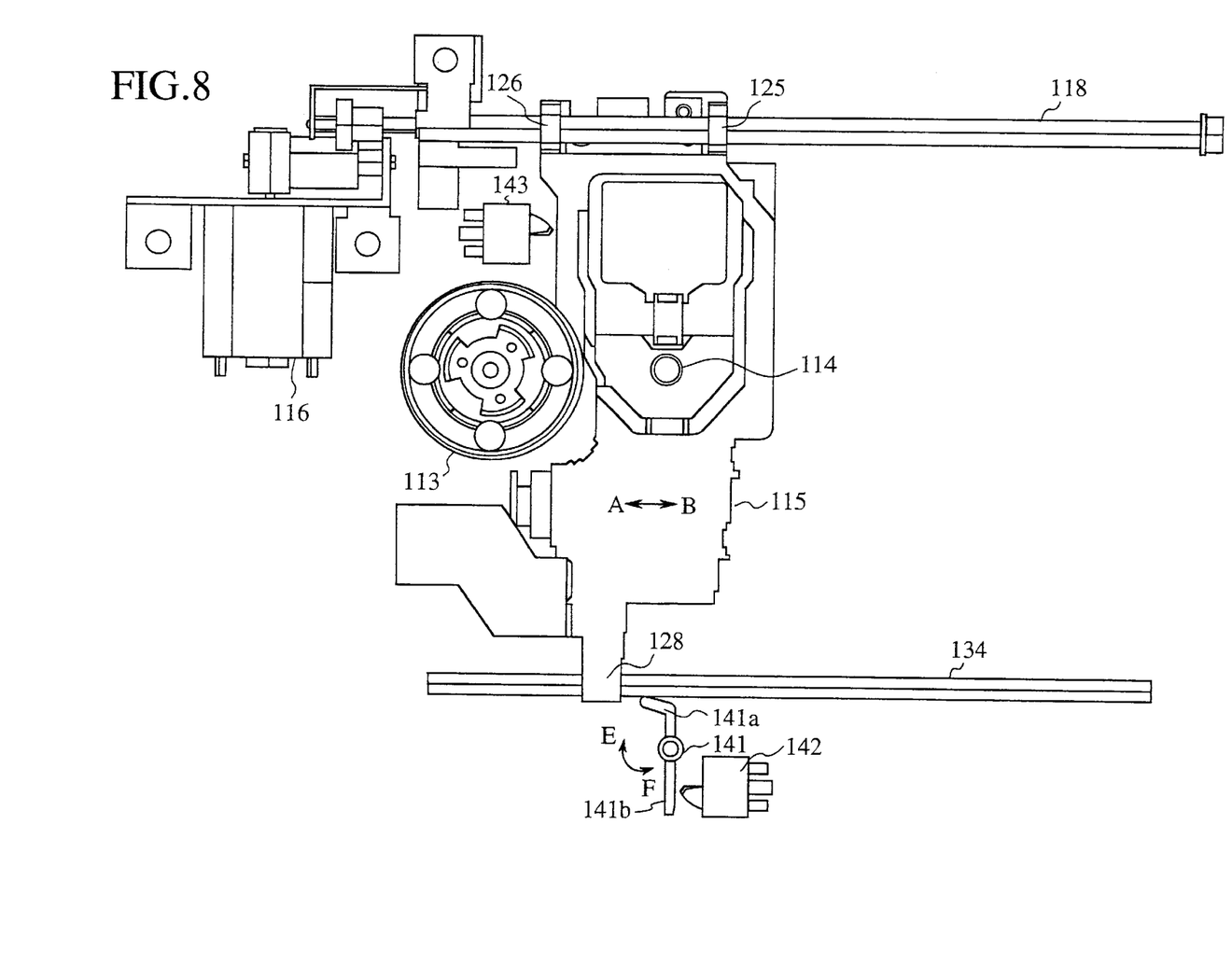
FIG. 8 is an explanatory view of a section of a disk device according to a second embodiment of the present invention.
Figure 9:
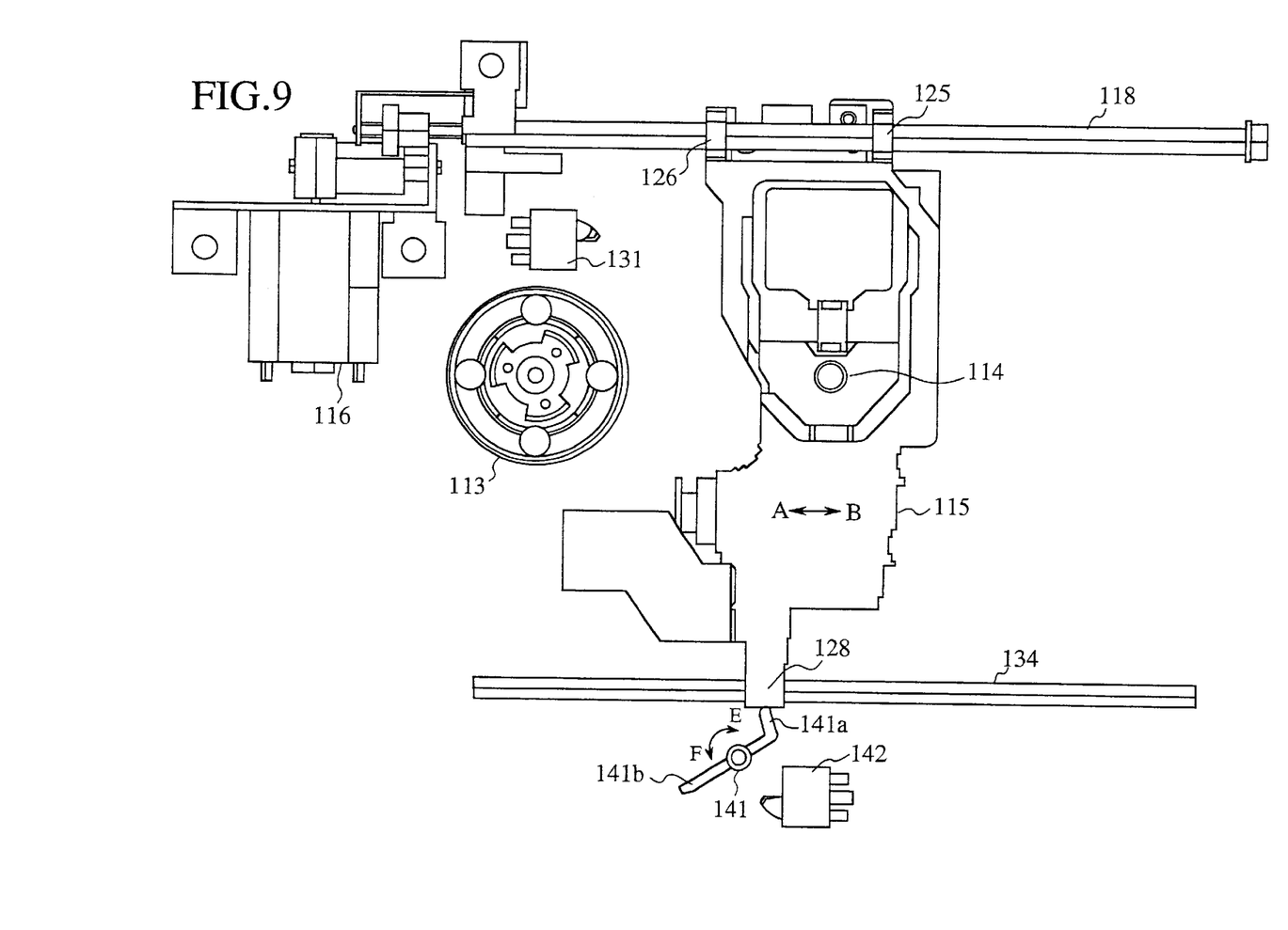
FIG. 9 is an explanatory view of a section of a disk device according to a second embodiment of the present invention.

FIGS. 7, 8 and 9 show partial structures of a disk device according to a second embodiment of the present invention. The other construction of the disk device according to the second embodiment is the same as that shown in FIG. 2 of the first embodiment. However in the second embodiment, instead of the movable member 131 and the switch 132 shown in FIG. 2, a rotating lever (detection selection means) 141, a switch (a second detection means) 142 and a switch (a first detection means) 143 are provided. Thus, components in FIGS. 7, 8 and 9 which are the same as those in FIG. 2 will not be explained. 128 is a guide shaft engagement section provided on the movable body 115, which is fit to the guide shaft 134 with a predetermined clearance.

The switch 142 is disposed in a position adjacent to the guide shaft 134 which guides the displacement of the movable body 115 in the direction of the arrow A and B. The center of the rotating lever 141 is mounted on the chassis 110 to be rotatable in a direction of arrow E and F. The rotating lever 141 is adapted to rotate in the direction of arrow F when one end 141a abuts with the guide shaft engaging section 128 of the movable body 115 which displaces in the direction of arrow A, thereby depressing the actuator of the switch 142 at the other end 141b. Further, since the end 141a of the rotating lever 141 is bent towards the turntable 113, displacement of the movable body 115 in the direction A is not impeded even when the end 141a abuts with the guide shaft engaging section 128 of the movable body 115 which displaces in the direction of the arrow A.

Next, the operation of the disk device according to the second embodiment of the present invention will be explained with reference to FIGS. 7, 8 and 9.

Due to displacement of the movable body 115 in the direction of arrow A from the playing region of the CD, the guide shaft engaging section 128 of the movable body 115 abuts with the bent end 141a of the rotating lever 141. As a result, the rotating lever 141 rotates in the direction of arrow F, the other end 141b depresses the actuator of the switch 142 and switches an internal state of the switch 142 from an initial state to an operational state.

This situation is shown in FIG. 7. When the internal state of the switch 142 is switched from the initial state to the operational state, it is possible to detect the displacement of the movable body 115 and the optical pickup 114 to an inner peripheral position of the CD in response to the switching timing of the switch 114 from the initial state to the operational state. This can be achieved by regulating the position of the switch 142 so that the optical pickup 114 provided on the movable body 115 is in a position corresponding to the inner peripheral position of the CD when the internal state of the switch 142 is switched from the initial state to the operational state.

When the movable body 115 further displaces in the direction A from the position as shown in FIG. 7, the guide shaft engagement section 128 of the movable body 115 is detached from the end 141a of the rotating lever 141 as shown in FIG. 8. As a result, the rotating lever 141 rotates in the direction E, thereby releasing the depression of the actuator of the switch 142.

The rotating lever 141 may be adapted to return to the normal position as shown in FIG. 8 by a return spring when the end 141a of the rotating lever 141 is not abutting with the guide shaft engagement section 128 of the movable body 115.

When the movable body 115 displaces further in the direction A from the position shown in FIG. 8, a part of the movable body 115 abuts with an actuator of the switch 143, an internal state of the switch 143 is switched from an initial state to an operational state. As a result, it is possible to detect the displacement of the optical pickup 114 and the movable body 115 to the inner peripheral position of the MD by detecting the switching timing of the internal state of the switch 143 from the initial position to the operational position.

On the other hand, when the movable body 115 displaces in the direction B from the position as shown in FIG. 8, the guide shaft engagement section 128 of the movable body 115 abuts with the end 141a of the rotating lever 141 from the left of the figure to the center. FIG. 9 shows this situation. Although the rotating lever 141 rotates in the direction E, the other end 141b of the rotating lever 141 does not depress the actuator of the switch 142.

That is to say, the movable body 115 depresses the actuator of the switch 142 on displacing in the direction of the arrow A. On displacing in the direction of the arrow B, the movable body 115 displaces without depressing the actuator of the switch 142.

In this way, the internal state of the switch 142 is selectively switched in accordance with the displacement direction of the movable body 115. Thus, for example, when playing an MD, it is possible to use a detection result of the switch 142 as a trigger for starting or stopping operation of other mechanisms by detecting a switch in the internal state of the switch 142 during the displacement of the movable body 115 to the outer peripheral position of the MD and by extracting the detection result as an electrical signal.

As shown above, according to the second embodiment of the present invention, it is possible to detect displacement of the optical pickup 114 and the movable body 115 to an inner peripheral position of the CD depending upon an internal state of the switch 142. Further, displacement of the optical pickup 114 and the movable body 115 to an inner peripheral position of the MD can be detected from an internal state of the switch 143. Furthermore, since the internal state of the switch 142 is selectively switched in accordance with the direction of displacement of the movable body 115, it is possible to provide a disk device which is capable of playing both the CD and the MD and in which the switch 142 can be used to, for example, control the starting and stopping operations of other mechanisms necessary for the playing operation, the ejection operation, and the loading operation of the disk.

As shown above, the disk device of the present invention is adapted for use as a vehicle-mounted disk device which can be used in common with a CD used as a single disk and with an MD used in cartridge stored form.

What is claimed is:

1. A disk device capable of loading and ejecting a case-stored recording medium disk, and a non case-stored recording medium disk, onto a turntable at different times, and capable of playing either said case-stored recording medium disk or said non case-stored recording medium disk, said disk device comprising:

a carriage provided with an optical pickup; and a disk inner peripheral position detection unit for detecting an inner peripheral position of the case-stored recording medium disk and the non case-stored recording medium disk, said disk inner peripheral position detection unit also detecting a displacement of said optical pickup to the inner peripheral position of the case-stored recording medium disk and the non case-stored recording medium disk.

2. A disk device according to claim 1, wherein said disk inner peripheral position detection unit comprises a detection unit for detecting the displacement of the optical pickup to the inner peripheral position and switching its internal state, said detection unit also detecting the inner peripheral position of the case-stored recording medium disk and the non case-stored recording medium disk, and wherein said disk inner peripheral position detection unit detects the displacement of said optical pickup to the inner peripheral position of the case-stored recording medium disk and the non case-stored recording medium disk on the basis of a detection result of said detection unit and a displacement direction of said carriage.

3. A disk device according to claim 2, wherein said disk inner peripheral position detection unit comprises a switch for mechanically detecting the displacement of the optical pickup to the inner peripheral position and switching its internal state, said switch also detecting the inner peripheral position of either the case-stored recording medium disk and the non case-stored recording medium disk, and a switch abutment member for changing the internal state of said switch when said carriage is displaced to the inner peripheral position, and wherein the displacement of said optical pickup to the inner peripheral position of the case-stored recording medium disk and the non case-stored recording medium disk is detected based on the internal state of said switch and a flow direction of current supplied to a motor for driving, said carriage, said flow direction of current depending on a displacement direction of said carriage.

4. A disk device capable of loading and ejecting a case-stored recording medium disk, and a non case-stored recording medium disk, onto a turntable at different times, and capable of playing either said case-stored recording medium disk or said non case-stored recording medium disk, said disk device comprising:

a carriage provided with an optical pickup; and a first detection means for detecting a displacement of said optical pickup to an inner peripheral position of said case-stored recording medium disk;

a second detection means for detecting a displacement of the optical pickup to an inner peripheral position of said non case-stored recording medium disk; and a detection selection means for selecting a detection result of said second detection means with respect to the displacement of the optical pickup to the inner peripheral position of said non case-stored recording medium disk, depending on a displacement direction of said carriage.

5. A method of detecting an inner and outer peripheral of a non case-stored disk and a case-stored disk in a disk device, said disk device capable of loading and ejecting said case-stored and non case-stored disks, onto a turntable, said method steps comprising:

detecting an inner peripheral position of said case-stored disk by a disk inner peripheral position detector;

detecting an inner peripheral position of said non case-stored disk by said disk inner peripheral position detector;

detecting a displacement of an optical pickup by said inner peripheral position detector with respect to the inner peripheral position of said case-stored and non-case stored recording disks.

6. A method of detecting an inner and outer peripheral of a non case-stored disk and a case-stored disk in a disk device, said disk device having an optical pickup and being capable of loading and ejecting said case-stored and non case-stored disks, onto a turntable, said method steps comprising:

detecting a displacement of said optical pickup to an inner peripheral position of said case-stored disk by a first detector;

detecting a displacement of said optical pickup to an inner peripheral position of said non case-stored disk by a second detector; and selecting a detection result of said second detector with respect to the displacement of said optical pickup to the inner peripheral position of said non case-stored disk, depending on a displacement direction said optical pickup.

* * * * *

UNITED STATES PATENT AND TRADEMARK OFFICE
CERTIFICATE OF CORRECTION

PATENT NO. : 6,741,542 B2
DATED : May 25, 2004
INVENTOR(S) : Kiichiro Murotani

Page 1 of 1

It is certified that error appears in the above-identified patent and that said Letters Patent is hereby corrected as shown below:

Title page,
Item [54], Title, "[54] DISK DEVICE" should read
-- [54]  DISK DEVICE WITH OPTICAL PICKUP DISPLACEMENT DETECTION MEANS --

Signed and Sealed this

Twenty-fifth Day of January, 2005

JON W. DUDAS
*Director of the United States Patent and Trademark Office*